United States Patent
Tsirkin et al.

(10) Patent No.: US 9,912,787 B2
(45) Date of Patent: Mar. 6, 2018

(54) ZERO-COPY MULTIPLEXING USING COPY-ON-WRITE

(71) Applicant: Red Hat Israel, Ltd., Ra'anana (IL)

(72) Inventors: Michael S. Tsirkin, Ra'anana (IL); Thomas Graf, Fehraltorf (CH)

(73) Assignee: RED HAT ISRAEL, LTD., Ra'anana (IL)

(*) Notice: Subject to any disclaimer, the term of this patent is extended or adjusted under 35 U.S.C. 154(b) by 193 days.

(21) Appl. No.: 14/457,171

(22) Filed: Aug. 12, 2014

(65) Prior Publication Data

US 2016/0050300 A1   Feb. 18, 2016

(51) Int. Cl.
*H04L 29/06* (2006.01)
*G06F 9/455* (2006.01)
*H04L 12/46* (2006.01)

(52) U.S. Cl.
CPC .......... *H04L 69/22* (2013.01); *G06F 9/45558* (2013.01); *H04L 12/4633* (2013.01); *G06F 9/455* (2013.01); *G06F 2009/45595* (2013.01)

(58) Field of Classification Search
CPC ........ H04L 69/22; H04L 63/10; G06F 9/5077
See application file for complete search history.

(56) References Cited

U.S. PATENT DOCUMENTS

| | | | |
|---|---|---|---|
| 7,389,462 B1* | 6/2008 | Wang | H04L 1/188 714/748 |
| 7,721,299 B2 | 5/2010 | Van Riel | |
| 8,250,586 B2 | 8/2012 | Nelson | |
| 8,537,860 B2 | 9/2013 | Kidambi et al. | |
| 8,561,066 B2 | 10/2013 | Koch et al. | |
| 8,665,725 B2 | 3/2014 | Kwan et al. | |
| 8,667,187 B2 | 3/2014 | Thakkar | |
| 2004/0010594 A1* | 1/2004 | Boyd | H04L 63/0485 709/227 |
| 2005/0207407 A1 | 9/2005 | Baumberger | |

(Continued)

OTHER PUBLICATIONS tech-faq.com, Understanding Data Encapsulation, May 5, 2012, http://www.tech-faq.com/understanding-data-encapsulation.html.*

(Continued)

*Primary Examiner* — Christopher Grey
*Assistant Examiner* — Richard Schnell
(74) *Attorney, Agent, or Firm* — Haynes and Boone, LLP

(57) ABSTRACT

Methods, systems, and computer program products for providing zero-copy multiplexing using copy-on-write are disclosed. Examples generally relate to both physical and virtualized computer systems. A computer-implemented method may include receiving notification of an incoming network packet, determining that a section of the network packet is to be modified, creating a copy of the network packet section to be modified, modifying the network packet section copy, and sending a memory location of the modified network packet section copy to an application. In a virtualized computer system, a hypervisor may receive notification of an incoming network packet, determine that a section of the network packet is to be modified, create a copy of the network packet section to be modified, modify the network packet section copy, and send a memory location of the modified network packet section copy to a guest when providing a modified network packet to the guest.

20 Claims, 4 Drawing Sheets

(56) References Cited

U.S. PATENT DOCUMENTS

| | | | |
|---|---|---|---|
| 2010/0211947 A1* | 8/2010 | van Riel | G06F 9/5077 718/1 |
| 2010/0325374 A1 | 12/2010 | Cypher et al. | |
| 2011/0125949 A1 | 5/2011 | Mudigonda et al. | |
| 2011/0314469 A1 | 12/2011 | Qian et al. | |
| 2012/0147890 A1 | 6/2012 | Kikuchi | |
| 2012/0254896 A1* | 10/2012 | Aloni | G06F 9/4555 719/319 |
| 2013/0117486 A1 | 5/2013 | Daniel | |
| 2013/0155083 A1 | 6/2013 | McKenzie et al. | |
| 2013/0262868 A1 | 10/2013 | Friedman et al. | |
| 2013/0308633 A1* | 11/2013 | Bergkvist | H04L 61/157 370/352 |
| 2013/0332678 A1 | 12/2013 | Fitzpatrick et al. | |
| 2014/0059537 A1 | 2/2014 | Kamble et al. | |
| 2016/0036822 A1* | 2/2016 | Kim | H04L 67/1097 726/4 |

OTHER PUBLICATIONS cubrid.org, Understanding TCP/IP Network Stack & Writing Network Apps, Mar. 2, 2013, http://www.cubrid.org/blog/dev-platform/understanding-tcp-ip-network-stack/.*

Chadd, Adrian, Andrian Chadd's Ramblings, Hacking on Receive Side Scaling (RSS) on FreeBSD, Experimenting with Zero-Copy Network IO in FreeBSD-HEAD, downloaded Jun. 27, 2014, 3 pages—http://adrianchadd.bloospot.in/2013/12/experimenting-with-zero-copy-network-io.html-http://msdn.microsoft.com/en-us/library/windows/hardware/ff567236(v=vs.85).aspx.

Koponen, Teemu et al., Network Virtualization in Multi-tenant Datacenters, International Computer Science Institute and UC Berkeley, USENIX The Advanced Computing Systems Association; Included in the Proceedings of the 11th USENIX Symposium on Networked Systems Design and Implementation (NSDI '14), Apr. 2-4, 2014, Seattle, WA, USA, https://www.usenix.org/conference/nsdi14/technical-sessions/presentation/koponen, 2013, 15 pages (pp. 202-216)—https://www.google.com/url?sa=t&rct=j&q=&esrc=s&source=web&cd=2&cad=rja&uact=8&ved=0CC4QFjAB&url=http%3A%2F%2Fdownload3.vmware.com%2Fsoftware%2Fvmw-tools%2Ftechnical_reports%2Fnetwork_virt_in_multi_tenant_dc.pdf&ei=ru1QU6KqElOyrgfdhoCYCQ&usg=AFQjCNEt3OrdyjgywyVrV6LF4QdCZ9PLow&bvm=by.65058239.d.bmk.

Mapp, Glenford, Low Latency Networking, Digital Technology Group Computer Laboratory,—http://www.cl.cam.ac.uk/Research/DTG/~gem11 downloaded Jun. 27, 2014, 56 pages—https://www.google.com/url?sa=t&rct=j&q=&esrc=s&source=web&cd=1&cad=rja&uact=8&ved=0CCUQFjAA&url=http%3A%2F%2Fwww.cl.cam.ac.uk%2Fteaching%2F0708%2FAddTopics%2FLow-Latency-Networking.ppt&ei=HO5QU_6Kl8KLrQfw8IGICA&usg=AFQjCNFAHIvCxBi4UcVU26213Lxlfx9yRQ&bvm=bv.65058239,d.bmk.

Zhang, Xiaolan et al., XenSocket: A High-Throughput Interdomain Transport for Virtual Machines, IBM T.J. Watson Research Center, 19 Skyline Drice, Hawthorne, NY 10532, USA, Arlington, VA, USA, Middleware 2007, LNCS, pp. 184-203. 20 pages—http://citeseerx.ist.psu.edu/viewdoc/download?doi=10.1.1.90.1901&rep=rep1&type=pdf.

Druschel, Peter et al., Fbufs: A High-Bandwidth Cross-Domain Transfer Facility, Department of Computer Science; The University of Arizone, Oct. 26, 1993, 14 pages—http://citeseerx.ist.psu.edu/viewdoc/download?doi=10.1.1.55.8375&rep=rep1&type=pdf.

Juniper Networks, Technical Documentation, Configuring Global Ingress and Egress Shared Buffers, Published: Jan. 16, 2013, 2 pages—http://www.juniper.net/techpubs/en_US/junos13.2/topics/task/configuration/cos-shared-buffer-global-qfx-series-cli.html.

\* cited by examiner

ZERO-COPY MULTIPLEXING USING COPY-ON-WRITE

TECHNICAL FIELD

Examples of the present disclosure generally relate to computer networks, and more specifically, relate to zero-copy multiplexing using copy-on-write.

BACKGROUND

Packet processing generally refers to the analysis, modification, and transferring of network packets, which is performed by various devices of a communications network. In packet processing, an entire network packet may be copied for each application or guest that is to receive the network packet. Such network packet duplication generally provides increased data security, but adversely impacts performance.

Alternatively, various applications and guests may be provided with access to the same network packet data in a shared area of memory. In such "zero-copy" configurations, network packet data is not copied from one area of memory to dedicated areas of memory associated with each application or guest. As a result, performance is generally faster, but network packet data is less secure.

Thus, in traditional packet processing, data security comes at the cost of performance, and vice versa. Accordingly, improved methods of packet processing can provide secure data access without sacrificing performance.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

SUMMARY OF THE INVENTION

Figure 1:
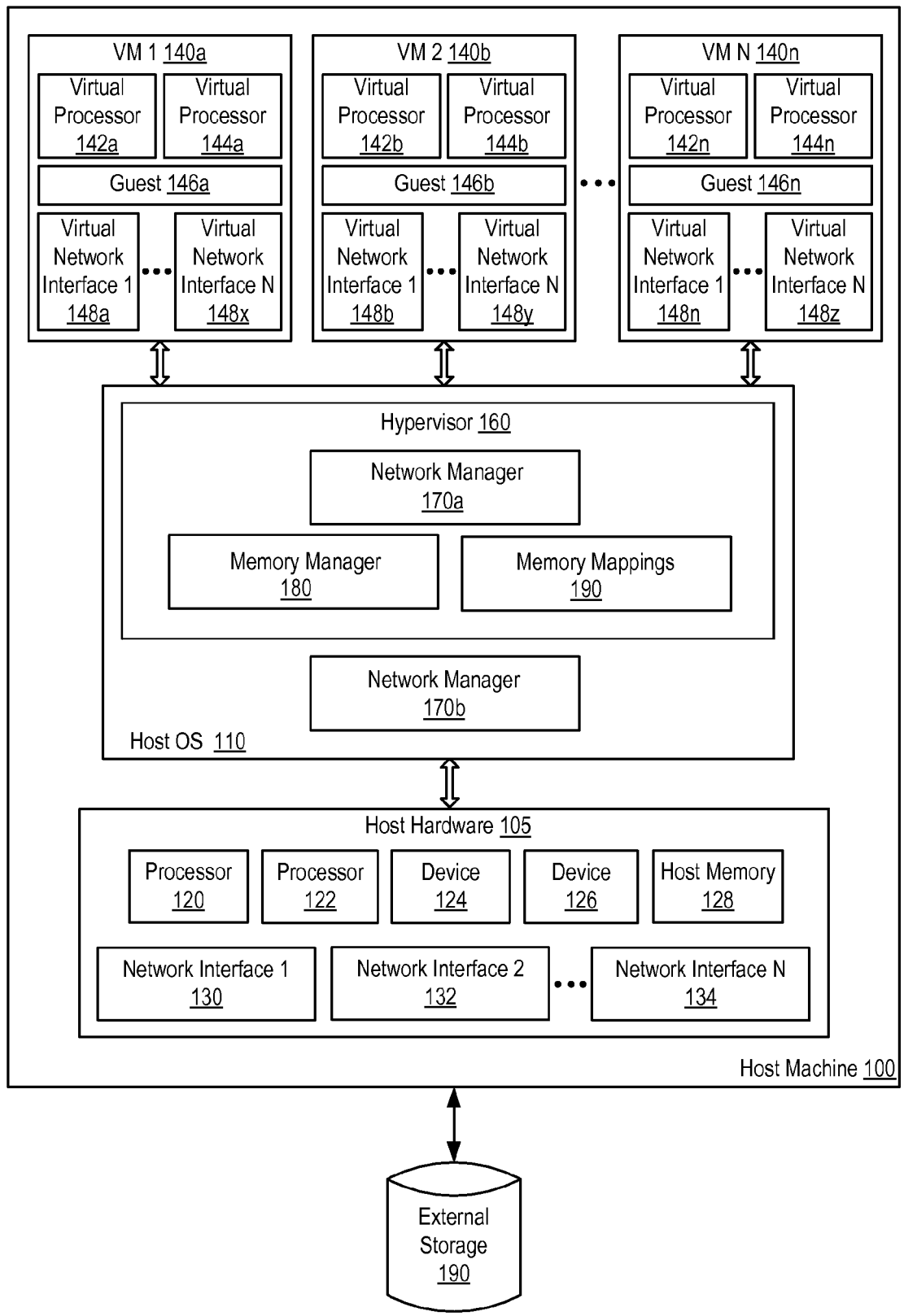
FIG. 1 is a block diagram illustrating an example of a computer system hosting one or more virtual machines.

Disclosed herein are systems, methods, and computer program products for performing zero-copy receive multiplexing using copy-on-write.

In an example, a network management module of a hypervisor or operating system maintains an area of shared host memory to store incoming network packets received by one or more network devices. The area of shared host memory may be accessible to both network devices and one or more applications/guests.

In an example, a network device notifies the network management module that an incoming packet has been received and stored in the area of shared host memory. The network management module then provides the original, incoming network packet to one or more applications/guests. The network management module then determines whether the network packet is to be modified before providing the network packet to one or more other applications/guests.

In an example, the network management module determines that a section of the network packet is to be modified before providing the network packet to a second application/guest. The network management module then creates a copy of the network packet section to be modified and performs the modification on the copy of the network packet section that it created.

In an example, the network management module sends a memory location of the modified copy of the network packet section to the second application/guest. The network management module also generally sends a guest or application a memory location for at least one unmodified section of the network packet that is part of the modified version of the network packet.

Accordingly, the network management module provides secure and efficient network processing by performing selective copying of network packet data in situations where a network packet data update is to be performed.

DETAILED DESCRIPTION

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a physical computer system, referred to herein as a host machine 100 that hosts one or more virtual machines (VMs) (e.g., VM1 140a, VM2 140b and VM N 140n). Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, host memory 128, multiple network interfaces 130, 132, 134, and other hardware components. Host memory 128 may include volatile memory devices (e.g., random access memory (RAM)), non-volatile memory devices (e.g., flash memory), and/or other types of memory devices. Host hardware 105 also may be coupled to external storage 190 via a direct connection or a local network. Host machine 100 may be a single machine or multiple host machines arranged in a cluster.

In an example, each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

A "processing device" generally refers to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 190), external I/O devices, etc. Devices 124, 126 communicate with host machine 100 (e.g., notify host machine 100 of events) by generating device interrupts.

Host machine 100 includes multiple network interfaces 130, 132, 134 that connect to host machine 100 to one or more networks. A network generally refers to any computer or telecommunications data path that allows the exchange of data between computer systems. Networks may include but are not limited to wired networks, wireless networks, public networks (e.g., the Internet), private networks (e.g., a local area network (LAN), a metropolitan area network (MAN), a wide area network (WAN)), fibre channel communication, or any combination thereof. Each network interface 130, 132, 134 allows host machine 100 to send and receive data via one or more networks.

Each network interface 130, 132, 134 may include one or more processors and one or more memory devices, which may be part of an application-specific integrated circuit (ASIC) of a network interface. The processors may perform operations on data within a respective network interface, for example, by preparing packets for transmission over a network, receiving packets from a network, etc. The memory devices may include read-only memory and/or random access memory for storing instructions to be executed, referenced, or otherwise used by the processors. Further, each network interface generally has a unique media access control (MAC) address used in switching and in other networking processing.

Host machine 100 includes a hypervisor 160 (also known as a virtual machine monitor (VMM)). In one example (as shown), hypervisor 160 is a component of a host operating system 110. Alternatively, hypervisor 160 may run on top of a host OS 110, or may run directly on host hardware 105 without the use of a host OS 110.

Hypervisor 160 manages system resources, including access to host memory 128, devices 124, 126, network interfaces 130, 132, 134, secondary storage, and so on. Hypervisor 160, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 160 presents to other software (i.e., "guest" software) the abstraction of one or more virtual machines (VMs) (e.g., VM 1 140a, VM 2 140b, VM N 140n), which may provide the same or different abstractions to various guest software (e.g., guest operating system, guest applications).

Host machine 100 hosts any number of virtual machines (VMs) (e.g., a single VM, one hundred VMs, etc.). A virtual machine (e.g., VM 1 140a, VM 2 140b, VM N 140n) is a combination of guest software that uses an underlying emulation of host machine 100 (e.g., as provided by hypervisor 160). Guest software (e.g., guest 146a, 146b, 146n) may include a guest operating system, guest applications, guest memory, guest device drivers, etc. Virtual machines 140a, 140b, 140n can be, for example, hardware emulation, full virtualization, para-virtualization, and operating system-level virtualization virtual machines. Virtual machines 140a, 140b, 140n may have the same or different guest operating systems, such as Linux®, Solaris®, Microsoft® Windows®, etc.

In an example, "containers" may be utilized in addition to or as an alternative to virtual machines. A container (not shown) generally refers to an isolated slice or set of operating system resources. For example, a container may provide a set of namespace-isolated computer system resources that are neither accessible nor visible to application processes running outside of the container. Containers may exist on the same host machine 100 as virtual machines and also may be managed by a hypervisor 160. Further, examples presented herein with respect to virtualized computing systems may also be applied to containers. Thus, a "guest" generally may refer to any virtualized tenant managed by a hypervisor 160, which includes but is not limited to virtual machines and containers.

Guest memory (not shown) generally describes memory allocated to and available for use by a guest 146a, 146b, 146n. In an example, guest memory may be memory presented to a guest OS by hypervisor 160. In one example, guest memory is mapped to and provided using corresponding memory from a host machine 100 (e.g., host memory 128). For example, a page (or other unit) of guest memory may be mapped to and provided using a corresponding page (or other unit) of host memory 128.

Each virtual machine 146a, 146b, 146n may include multiple virtual processors (e.g., virtual processors 142a and 144a, 142b and 144b, 142n and 144n). Each virtual processor of a respective virtual machine executes on a specific processor 120, 122 of host machine 100. Hypervisor 160 may control which virtual processors run on which hardware processors 120, 122. For example, one virtual processor may run on a physical processor 120, and a second virtual processor may run on a different physical processor 122 (or vice versa).

Each virtual machine (VM 1 140a, VM2 140b . . . VM N 140n) may include multiple virtual network interfaces (e.g., virtual network interface 1 148a . . . virtual network interface N 148x, virtual interface 1 148b . . . virtual network interface N 148y, virtual network interface 1 148n . . . virtual network interface N 148z). A virtual network interface generally describes an emulation of a physical networking interface provided for a virtual machine. Each network interface (e.g., network interface 1 130, network interface 2 132, network interface N 134) can be used to provide underlying network communication for one or more virtual network interfaces.

Hypervisor 160 includes a network manager 170a. Host OS 110 also may include a network manager 170b (e.g., additionally or alternatively). In an example, a network manager 170a, 170b manages interaction between virtual network interfaces (e.g., virtual network interface 1 148a) and physical network interfaces (e.g., network interface 1 130). In one example, a network manager 170a, 170b creates and maintains network interface mappings between network interfaces, such as between a virtual and a physical network interface.

In an example, a network manager 170a, 170b receives and processes inbound and outbound network packets. For example, a network manager 170a, 170b may receive inbound network packets from one or more network interfaces (e.g., network interface 1 130 . . . network interface N 134) that are to be delivered to one or more virtual machines (e.g., VM1 140a . . . VM N 140n). A network manager 170a, 170b also may receive outbound network packets from one or more virtual machines (e.g., VM1 140a . . . VM N 140n) that are to be sent over a network by one or more network interfaces (e.g., network interface 1 130 . . . network interface N 134).

In an example, a network manager 170a, 170b also examines network packets, updates network packets, and forwards network packets to appropriate physical and virtual network interfaces. The term "network packet" generally refers to a data packet or other formatted data unit that is transferable over a packet-switched network (e.g., IP packets).

In an example, a network manager 170a, 170b performs additional various shared network management operations, such as zero-copy multiplexing using copy-on-write for hypervisor 160 or host OS 110. In one example, a network manager 170a of a hypervisor 160 performs zero-copy multiplexing when detecting that a section of an incoming network packet is to be modified prior to providing the network packet to a guest (e.g., a virtual machine, container, etc.). Network manager 170a then creates a copy of the network packet section to be modified in memory, modifies the copy of the network packet section created in memory, and sends a memory location of the modified copy of the network packet section to a guest as part of providing the guest with a modified version of the network packet. Similarly, a network manager 170b of a host OS 110 may perform similar steps to provide a modified network packet to a software application running on the host OS 110.

Hypervisor 160 also includes a memory manager 180 and memory mappings 182. In an example, memory manager 180 tracks and manages associations between guest memory (not shown) and host memory 128 using memory mappings 182. For example, memory manager 180 may maintain a table, list or other data structure that associates an address of guest memory (e.g., a guest address) with an address of corresponding host memory 128 (e.g., a host address). A "guest address" generally may refer to either a virtual or physical guest memory address. In addition, a "host address" generally may refer to either a virtual or physical host memory address.

In general, examples of the present disclosure may be applied similarly with respect to virtualized and physical computer systems. For example, while a network manager 170a of a hypervisor 160 may perform zero-copy multiplexing using copy-on-write when interacting with guests (e.g., virtual machines, containers, etc.), a network manager 170b of a host OS 110 similarly may perform zero-copy multiplexing using copy-on-write when interacting with various applications, processes, threads, tasks, etc. Accordingly, examples of zero-copy multiplexing using copy-on-write presented in the context of virtualized systems may be applied similarly to physical computer systems. Further, examples presented in the context of physical computer systems or virtualized computer systems are not intended to be limiting and may be applied similarly in other contexts.

Figure 2:
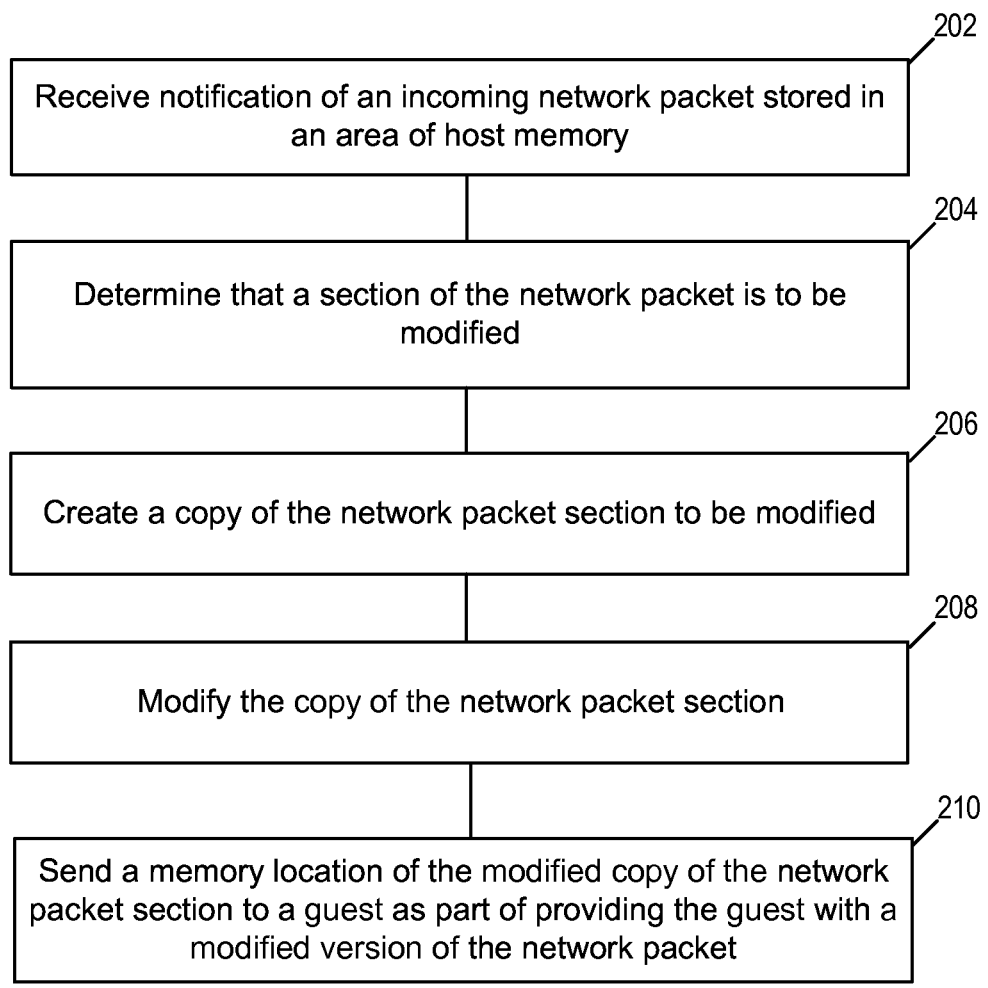
FIG. 2 is a flow diagram illustrating an example of a method for performing zero-copy multiplexing using copy-on-write.

FIG. 2 is a flow diagram illustrating an example of a method for performing zero-copy receive multiplexing using copy-on-write. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 200 is performed by network manager 170a of hypervisor 160. In one example, the method 200 is performed by network manager 170b of host OS 110. Examples are discussed in the context of network manager 170a of hypervisor 160 for the purposes of illustration and consistency. However, such examples are applicable to both physical computer systems and virtualized computer systems.

Method 200 begins at block 202 when network manager 170a of hypervisor 160 receives notification of an incoming network packet stored in an area of host memory 128. In an example, network manager 170a receives a notification from a network device (e.g., network interface 1 130, network interface 2 132, or network interface N 134) indicating that the network device has stored an incoming network packet in an area of host memory 128. In one example, the network device provides network manager 170a with a host memory address indicating a location in host memory 128 where the network device has stored the incoming network packet.

At block 204, network manager 170a determines that a section of the network packet is to be modified. In an example, network manager 170a locates the network packet in host memory 128 using a host memory address provided by a network device (e.g., network interface 1 130, network interface 2 132, or network interface N 134). In one example, network manager 170a examines an incoming network packet to determine how to process the network packet. For example, network manager 170a may analyze header or other data of the network packet to determine which guest or guests are to receive the network packet. Network manager 170a also may analyze local and/or centralized network configuration to determine which guest or guests to notify and/or whether the network packet is to be modified prior to providing the network packet to any of one or more guests.

In an example, network manager 170a determines that a network packet is to be modified with network encapsulation data (e.g., Virtual Local Area Network (VLAN) data, Virtual Extensible Local Area Network (VXLAN) data, generic routing encapsulation (GRE) data, etc.) For example, network manager 170a may determine that network encapsulation data is to be added to a network packet before providing the network packet to a guest based on network configuration information and/or network packet data. In one example, network manager 170a also identifies a section of the network packet that is to be modified. For example, network manager 170a may determine that a packet header, a subset of a packet header (e.g., one or more header fields), packet data, a subset of packet data, or any other section of the network packet is to be modified.

A "section" generally refers to a part, subset, or segment of a network packet that is less than an entire network packet. Thus, a network packet may have two or more sections, which may be predetermined sections (e.g., header, data, etc.) or arbitrarily determined sections (e.g., fields, partial data, memory segments, etc.).

At block 206, network manager 170a creates a copy of the network packet section that is to be modified. In an example, network manager 170a copies the network packet section to a different location in host memory 128. In one example, network manager 170a creates a copy of the network packet section to provide a modified version of the network packet to a guest without affecting an original, unmodified version of the network packet maintained for one or more different guests. For example, network manager 170*a* may modify the copy of the network packet section and associate the modified copy with one or more other original sections of a network packet to provide a guest with a modified version of a network packet.

At block 208, network manager 170*a* modifies the copy of the network packet section. In an example, network manager 170*a* modifies the copy of the network packet section by adding, updating or deleting data. In one example, network manager 170*a* adds network encapsulation data to the copy of the network packet section. Network manager 170*a* also may remove network encapsulation data from the copy of the network packet section.

At block 210, network manager 170*a* sends a memory location of the modified copy of the network packet section to a guest as part of providing the guest with a modified version of the network packet. In an example, network manager 170*a* provides a modified version of a network packet to a guest by sending the guest a memory location of the modified copy of the network packet section and one or more memory locations of at least one other unmodified section of the original network packet. In one example, network manager 170*a* provides additional information, such as section ordering or sequence information, to allow a guest to assemble various modified and unmodified sections of a network packet into a modified version of the network packet.

Figure 3:
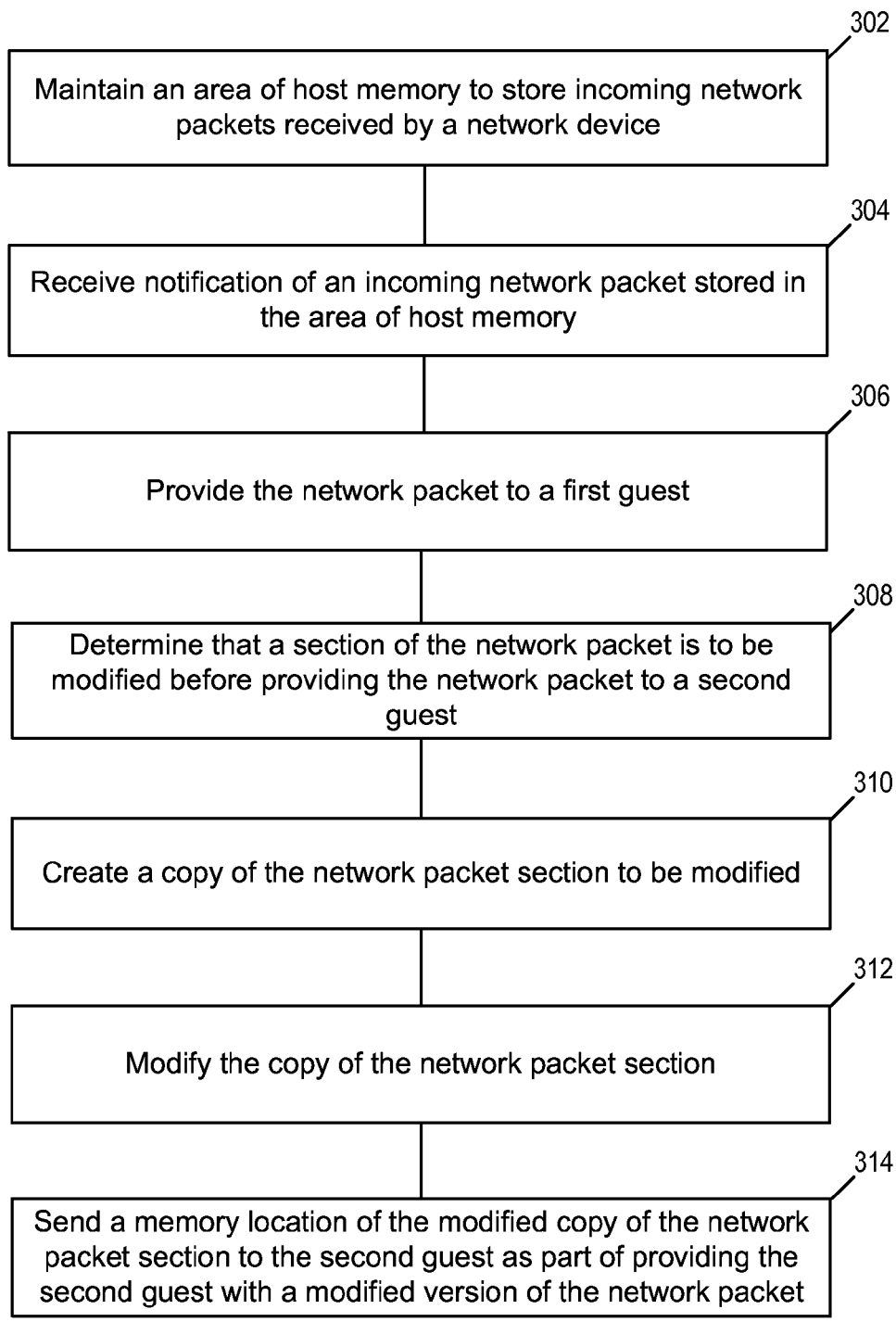
FIG. 3 is a flow diagram illustrating an example of a method for performing zero-copy multiplexing using copy-on-write when forwarding an incoming network packet to different guests.

FIG. 3 is a flow diagram illustrating an example of a method for performing zero-copy receive multiplexing using copy-on-write when forwarding an incoming network packet to different guests. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

In an example, the method 300 is performed by network manager 170*a* of hypervisor 160. In one example, the method 300 is performed by network manager 170*b* of host OS 110. Examples are discussed in the context of network manager 170*a* of hypervisor 160 for the purposes of illustration and consistency. However, such examples are applicable to both physical computer systems and virtualized computer systems.

Method 300 begins at block 302 when network manager 170*a* maintains an area of host memory 128 to store incoming network packets received by a network device. In an example, network manager 170*a* allocates and maintains an area of shared host memory 128 to store various incoming network packets received from one or more networking devices (e.g., network interface 1 130, network interface 2 132, or network interface N 134). In one example, network manager 170*a* uses the area of host memory 128 to receive, manage, and provide incoming network packets to one or more guests (virtual machines, containers, etc.) managed by a hypervisor 160.

In an example, network manager 170*a* provides one or more network devices with access to the area of host memory 128. For example, network manager 170*a* may allow each of the network devices to store incoming network packets in the area of host memory 128. In one example, the area of host memory 128 is also shared by one or more guests (e.g., virtual machines, containers, etc.) having access to the area of host memory 128. Further, the network devices are generally non-dedicated so that any network device may provide incoming packets to any guest.

In an example, the area of host memory 128 shared by one or more guests may be write-protected to prevent one or more guests from modifying the area of host memory 128. In one example, guest memory for one or more guests corresponding to the area of host memory 128 is write-protected. In one example, an error or notification is generated when a guest attempts to modify a write-protected area of memory, and the attempt is blocked. In some examples, a hypervisor 160 also may terminate a guest that attempts to modify write-protected memory in the area of host memory 128 used to process network traffic.

At block 304, network manager 170*a* receives notification of an incoming network packet stored in the area of host memory. In an example, a network device notifies network manager 170*a* that a stored, incoming network packet is available for processing. For example, the network device may receive the incoming network packet, store the incoming network packet in an area of host memory, and notify network manager 170*a* that the incoming network packet is available for processing. In one example, the network device provides network manager 170*a* with a host memory address indicating where the network device has stored the incoming network packet in host memory 128.

At block 306, network manager 170*a* provides the network packet to a first guest. In an example, network manager 170*a* provides an original, unmodified network packet to a first guest (e.g., a virtual machine, a container, etc.). In one example, network manager 170*a* provides an incoming network packet to a guest by sending a memory location that the guest may use to access the network packet. For example, network manager 170*a* may send the guest a host memory address to allow the guest to directly access the network packet in shared host memory 128. Network manager 170*a* also may send a guest memory address mapped to shared host memory 128 to provide a guest with access to a network packet.

At block 308, network manager 170*a* determines that a section of the network packet is to be modified before providing the network packet to a second guest. In an example, network manager 170*a* locates the network packet in host memory 128 using a host memory address provided by a network device and examines the network packet. In one example, network manager 170*a* analyzes one or more of network packet header data, non-header network packet data, local network configuration information, and centralized network configuration information to determine how to process the incoming network packet.

In an example, network manager 170*a* determines that an incoming network packet to be provided to one or more guests is to be modified. For example, network manager 170*a* may determine that network encapsulation data is to be added to a network packet before providing the network packet to a guest.

In an example, network manager 170*a* receives notification from a guest indicating that a network packet is to be modified. For example, a guest may notify network manager 170*a* of a packet modification via a communication channel, such as a virtual input/output communication channel (e.g., Virtio for the Linux® operating system). In one example, a guest notifies network manager 170*a* that a provided network packet is to be modified. In response, network manager 170*a* performs a copy-on-write using the entire network packet or a section of the network packet that is to be modified. The copy-on-write operation may be performed, for example, to provide the notifying guest with a modified version of the network packet while allowing other guests access to an original or unmodified version of the packet.

In an example, network manager 170a identifies a section of a network packet that is to be modified. For example, network manager 170a may determine that a network packet header, a subset of network packet header data (e.g., one or more network packet header fields), network packet data, a subset of network packet data, or one or more other sections of the network packet are to be modified. In one example, a network packet may have two or more sections, which may be predetermined or predefined (e.g., header, data, etc.). A network packet also may have two or more arbitrarily determined sections (e.g., header fields, partial data, memory segments holding network packet data, etc.).

At block 310, network manager 170a creates a copy of the network packet section to be modified. In an example, network manager 170a creates an independent copy of the network packet section for modification to provide one or more guests with a modified version of the network packet while providing one or more other guests with an original, unmodified version of the network packet (e.g., as a copy-on-write operation). In one example, network manager 170a may modify the copy of the network packet section and associate the modified copy of the section with one or more original sections of the network packet as part of providing a modified version of a network packet to a guest.

At block 312, network manager 170a modifies the copy of the network packet section. In an example, network manager 170a modifies the copy of the network packet section by adding, updating or deleting data. In one example, network manager 170a adds or removes network encapsulation or other data from the copy based on one or more of network packet header data, non-header network packet data, local network configuration information, and centralized network configuration information.

At block 314, network manager 170a sends the memory location of the modified copy of the network packet section to the second guest as part of providing the second guest with the modified version of the network packet. In an example, network manager 170a sends a memory location of a modified copy of the network packet section and another memory location for an unmodified section of a corresponding original network packet to the second guest to provide the second guest with the modified version of the network packet. In one example, network manager 170a also provides the second guest with information to allow the second guest to assemble the various network packet sections into the modified version of the network packet. (e.g., packet formatting, packet section sequencing, etc.). In a further example, network manager 170a may continue to provide other guests with the original, unmodified version of a network packet maintained in host memory 128.

Figure 4:
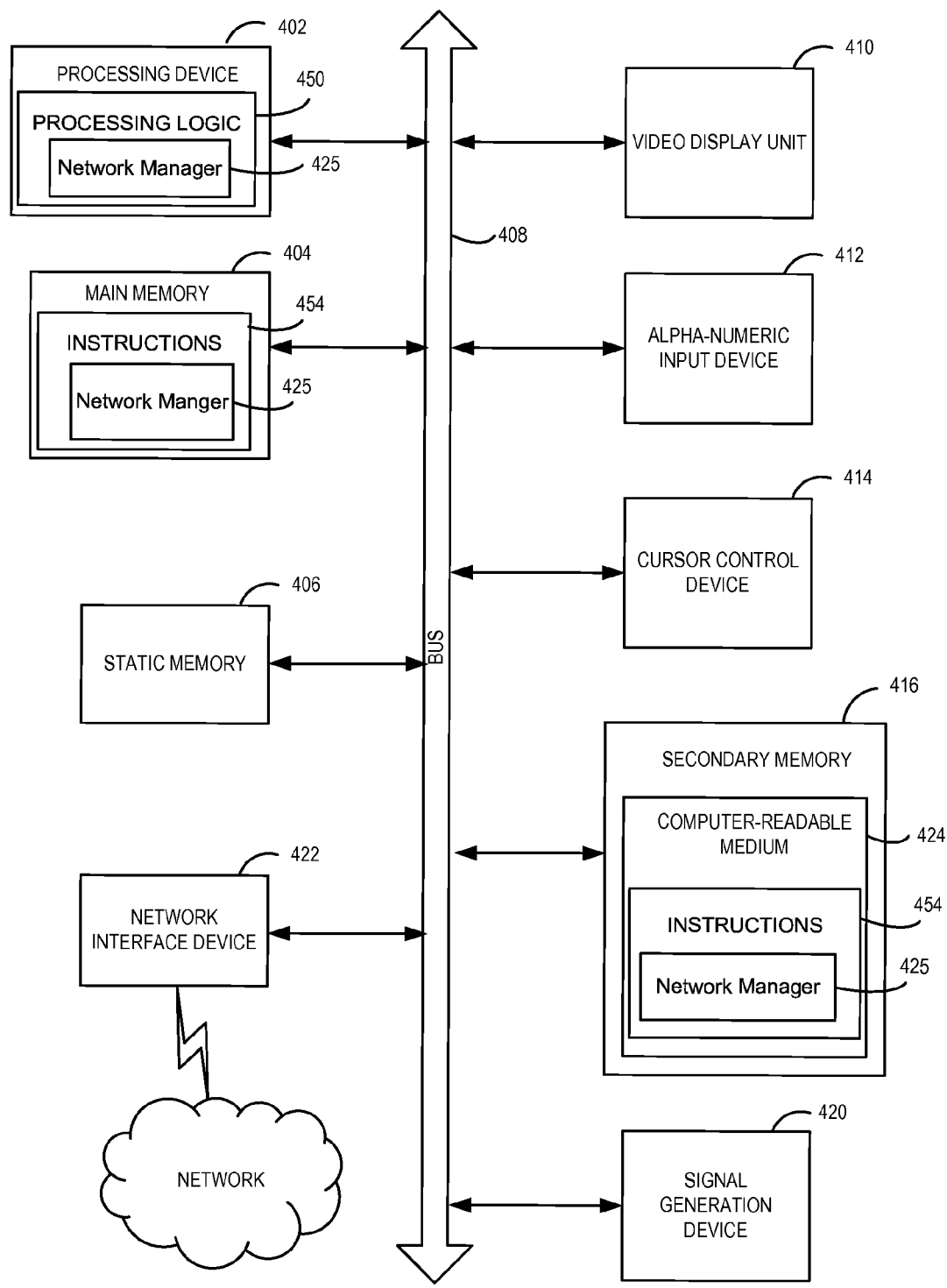
FIG. 4 illustrates a diagrammatic representation of a machine in the example form of a computer system.

FIG. 4 illustrates a diagrammatic representation of a machine in the example form of a computer system 400 within which a set of instructions, for causing the machine to perform any one or more of the methodologies discussed herein, may be executed. The computer system 400 may correspond, for example, to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processing devices such as a microprocessor, central processing unit, or the like. The processing device may include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., network manager 425). The instructions 454 may also reside, completely or at least partially, within the main memory 404 and/or within the processing device 402 during execution thereof by the computer system 400 (the main memory 404 and the processing device 402 constituting machine-readable storage media).

While the computer-readable storage medium 424 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 400 may additionally include a network manager module (not shown) for implementing the functionalities of a network manager 425 (e.g., network manager 170a, network manager 170b). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "processing", "executing", "modifying", "creating", "detecting," "copying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
   providing, by a hypervisor, a first guest and a second guest with access to an area of shared host memory accessible to both the first guest and the second guest, the shared host memory providing both the first guest and the second guest with shared data access;
   receiving, by the hypervisor, a notification regarding a network packet stored in the shared host memory;
   determining, by the hypervisor, that the network packet is to be provided to the first guest and the second guest;
   determining, by the hypervisor, a section of the network packet is to be modified for the second guest;
   creating, by the hypervisor, a modified copy of the section of the network packet for the second guest based on the determining that the network packet is to be modified for the second guest;
   providing, by the hypervisor, the network packet to the first guest by communicating a first memory address of the network packet in the shared host memory to the first guest; and
   providing, by the hypervisor, the network packet to the second guest by communicating a second memory address of the modified copy of the section of the network packet and a third memory address of an unmodified section of the network packet in the shared host memory to the second guest.

2. The computer-implemented method of claim 1, wherein the hypervisor further provides the second guest with information allowing the second guest to associate the second memory address of the modified copy of the section of the network packet with the third memory address of the unmodified section of the network packet.

3. The computer-implemented method of claim 1, wherein the hypervisor determines that a header section of the network packet is to be modified for the second guest.

4. The computer-implemented method of claim 1, wherein the hypervisor determines that a non-header section of the network packet is to be modified for the second guest.

5. The computer-implemented method of claim 1, wherein the hypervisor determines that network encapsulation data is to be added to the network packet for the second guest.

6. The computer-implemented method of claim 1, wherein the hypervisor determines that the network encapsulation data is to be removed from the network packet for the second guest.

7. The computer-implemented method of claim 1, wherein the unmodified section of the network packet continues to be accessible to the first guest and the second guest in the shared hot memory, and wherein the second memory address of the modified copy of the section of the network packet is accessible to the second guest in unshared host memory.

8. The computer-implemented method of claim 1, wherein the hypervisor modifies the created copy of the section of the network packet after providing the first memory address to the first guest.

9. The computer-implemented method of claim 1, further comprising:
   providing, by the hypervisor, a third guest with the first memory address of the network packet in the area of shared host memory.

10. The computer-implemented method of claim 1, further comprising:
    maintaining, by the hypervisor, the area of shared host memory to store network packets received from each one of a plurality of network devices.

11. The computer-implemented method of claim 1, further comprising:

providing, by the hypervisor, a physical network device with write access to the area of shared host memory accessible to both the first guest and the second guest.

12. The computer-implemented method of claim 1, further comprising:
storing, by a physical network device, the network packet in the area of shared host memory.

13. The computer-implemented method of claim 1, wherein the hypervisor provides the second memory address and the third memory address to the second guest after providing the first memory address to the second guest.

14. The computer-implemented method of claim 1, wherein the modified copy of the section of the network packet permits writes associated with the second guest and prevents writes associated with the first guest.

15. The computer-implemented method of claim 1, wherein the first memory address of the network packet is write protected preventing one or more of the guests sharing access to the network packet from modifying the network packet.

16. A non-transitory computer-readable medium having instructions recorded thereon, that when executed by a processor, cause the processor to perform operations, comprising:
providing, by a hypervisor, a first guest and a second guest with access to an area of shared host memory accessible to both the first guest and the second guest, the shared host memory providing both the first guest and the second guest with shared data access;
determining, by the hypervisor, that a section of a network packet stored in the shared host memory is to be modified for the second guest;
creating, by the hypervisor, a modified copy of the section of the network packet based on the determining;
providing, by the hypervisor, the network packet to the first guest by communicating a first memory address of the network packet in the shared host memory to the first guest; and
providing, by the hypervisor, the network packet to the second guest by communicating the first memory address of the network packet in the shared host memory and a second memory address of the modified copy of the section of the network packet to the second guest.

17. The non-transitory computer-readable storage medium of claim 16, the operations further comprising:
maintaining, by the hypervisor, the area of shared host memory for processing a plurality of network packets received from each one of a plurality of network devices.

18. The non-transitory computer-readable storage medium of claim 16, wherein a physical network device directly writes the network packet to the area of shared host memory.

19. A computer system, comprising:
a non-transitory memory; and
a processor coupled to the non-transitory memory to:
provide a first guest and a second guest with access to an area of shared host memory accessible to both the first guest and the second guest, the shared host memory providing both the first guest and the second guest with shared data access;
receive a notification indicating presence of a network packet stored in the shared memory;
determine a first section of the network packet is to be modified for the second guest;
create a copy of the first section of the network packet based on the determining; and
provide the network packet to the second guest by communicating a first memory address of the created copy of the first section of the network packet and a second memory address in the shared memory for a second section of the network packet to the second guest.

20. The computer system of claim 19, wherein the processor further provides the second guest with information allowing the second guest to associate the first memory address of the created copy of the first section of the network packet with the second memory section of the network packet in the shared memory.

* * * * *